United States Patent [19]

Riley

[11] Patent Number: 4,810,025
[45] Date of Patent: Mar. 7, 1989

[54] RAIN DEFLECTOR FOR MOTOR HOME UTILITY DOOR

[75] Inventor: Martin O. Riley, Pasadena, Calif.

[73] Assignee: Recreational Components, Inc., Pasadena, Calif.

[21] Appl. No.: 7,000

[22] Filed: Jan. 27, 1987

[51] Int. Cl.⁴ .............................................. B60J 5/04
[52] U.S. Cl. .................................. 296/146; 296/37.6; 296/202; 296/154; 52/97; 49/381; 49/400
[58] Field of Search ...................... 296/37.6, 202, 203, 296/208, 146, 152, 154, 156, 164, 163, 95 R; 52/97, 74; 49/381, 400, 502, 504; 160/44, DIG. 3

[56] References Cited

U.S. PATENT DOCUMENTS

| D. 148,831 | 2/1948 | Wagner | 296/152 X |
| 1,615,078 | 1/1927 | Grigsby | 296/95 R |
| 1,670,465 | 5/1928 | Marshall | 160/44 |
| 1,827,299 | 10/1931 | Pritchard | 296/152 |
| 2,205,797 | 6/1940 | Ledwinka | 296/213 |
| 2,826,447 | 3/1958 | Renno | 296/146 |
| 4,265,052 | 5/1981 | Johnson et al. | 49/504 X |
| 4,417,762 | 11/1983 | Imai et al. | 296/210 |

OTHER PUBLICATIONS

Recreational Components, Inc. Brochure, Jul. 1, 1984.

*Primary Examiner*—Dennis H. Pedder
*Attorney, Agent, or Firm*—Freilich, Hornbaker, Rosen & Fernandez

[57] ABSTRACT

A utility door assembly is provided for mounting on the side of a recreation vehicle, which includes a rain deflector over the door that minimizes the leakage of rain through the top of the door. The deflector includes an upper surface extending at a downward-outward incline of at least 60° from the horizontal, and merging with a lower surface that extends in a concave curve that is progressively more horizontal at progressively outward locations, with the botton of the deflector surface lying outward of the door and ending in a sharp corner. Raindrops which have impacted the vehicle and are flowing downwardly along the side are directed downwardly and outwardly so they tend to fly away from the outer edge of the deflector instead of flowing around it and leaking in through the top of the utility door.

6 Claims, 1 Drawing Sheet

RAIN DEFLECTOR FOR MOTOR HOME UTILITY DOOR

BACKGROUND OF THE INVENTION

Utility doors are commonly used at the sides of recreation vehicles to provide access for gas, water, sewer, and electrical utilities. Especially in the case of electrical utilities, it is important to avoid the leakage of rainwater through the door into the utility. When the vehicle is traveling for a considerable period in a heavy rainstorm, large amounts of water drip down along the side of the vehicle over the door. Although it would be possible to use properly installed rubber sealing strips which were compressed to seal out rainwater, it would be difficult to assure consistent high quality installation at low cost. Door assemblies can be made accurately and economically by injection molding of a limited number of parts that fit together in a simple manner. A utility door assembly that could be molded to resist the entrance of water through the door, instead of only sealing against the entry of water that has found its way to the door, would be of considerable value in the production of low-cost utility doors that resisted the leakage of rainwater.

SUMMARY OF THE INVENTION

In accordance with one embodiment of the present invention, a utility door assembly is provided which can be constructed at low cost, and yet which resists the leakage of rainwater past the door. The door frame includes a rain deflector which has an upper surface portion extending at a downward-outward incline of at least 45° from the horizontal, and which merges into a lower surface portion that extends in a concave curve lying at a progressively more horizontal direction at progressively outward locations. The bottom of the lower surface portion lies outwardly of the door and only slightly above it, and ends in a sharp corner. Water droplets fall along the surface portions and are directed outwardly from the top of the door, to minimize the leakage of rain through the door.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
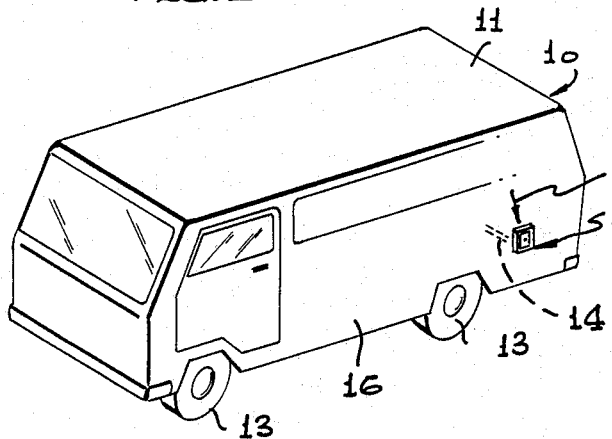
FIG. 1 is a perspective view of a recreation vehicle, showing a utility door assembly thereon.

FIG. 1 illustrates a recreation vehicle 10 which has a body 11 and wheels 13 for supporting the body in primarily forward movement along the ground. A utility door assembly 12 lies at a side 16 of the vehicle body, and provides access to an electrical conductor 14 in the vehicle. When the vehicle encounters rain, numerous rain droplets move largely downwardly along a side of the vehicle above the door assembly, as indicated by arrow 18, and may leak around the top of the door assembly into the electrical system and cause corrosion and/or a short circuit, and rotting in the wooden floor of the vehicle.

Figure 2:
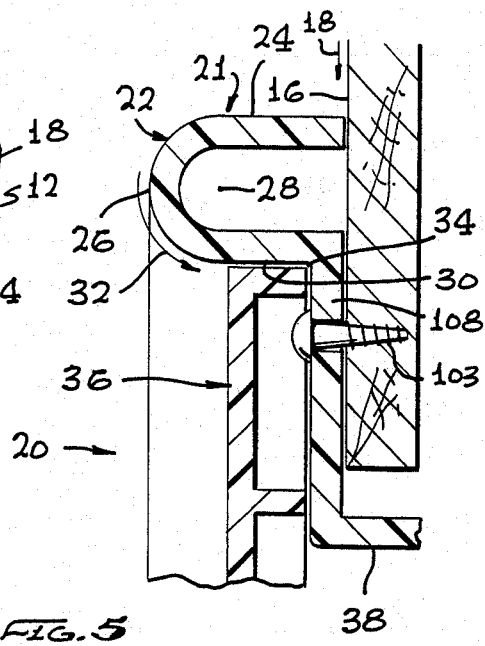
FIG. 2 is a sectional view of utility door assembly of the prior art.
Figure 3:
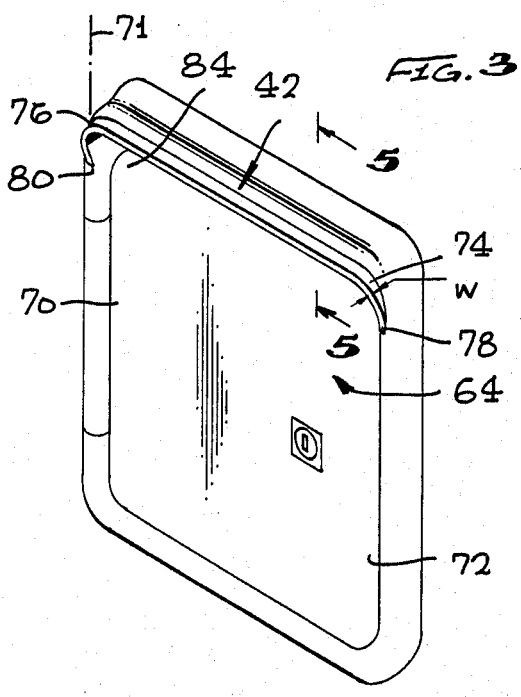
FIG. 3 is a perspective view of a present utility door assembly constructed in accordance with the present invention, with the door closed.

FIG. 2 illustrates the upper portion of a prior art door assembly 20, wherein the upper portion of the door frame 21 has an outside surface 22. The outside surface has a top surface portion 24 that is flat, an outer surface portion 26 that is curved by a half circle about a point 28, and a downwardly facing bottom surface portion 30 that is also flat. A raindrop moving in the direction of the arrow 18 along the side 16 of the vehicle is likely to move along the path portion 32 around the rounded outer portion of the frame surface and pass through the region 34 between the frame 21 and door 36, and enter the region or space 38 where exposed electrical terminals lay. The raindrop is likely to pass along the path portion 32 because water clings to most plastics that are suitable for the door frame, such as an ABS type.

Figure 5:
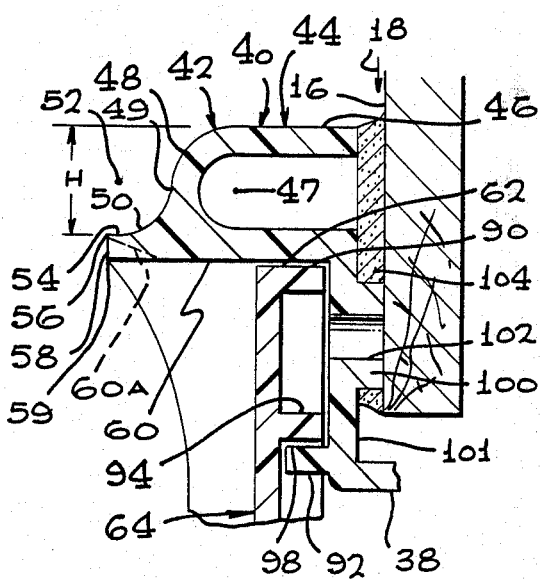
FIG. 5 is a view taken across lines 5—5 of FIG. 3.
Figure 4:
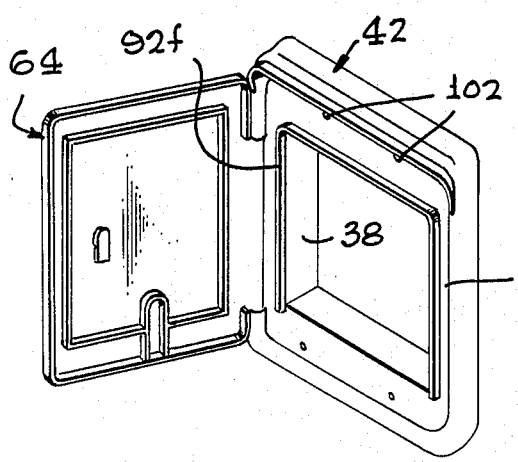
FIG. 4 is a perspective view similar to that of FIG. 3, but showing the door open.
Figure 6:
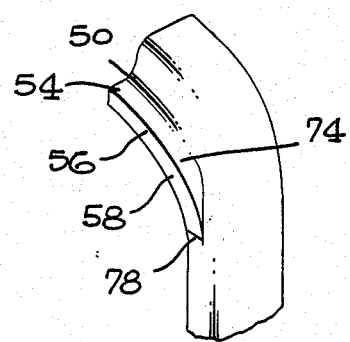
FIG. 6 is a perspective view of a corner portion of the assembly of FIG. 2.

Applicant forms the upper part of the door frame 42, as shown in FIG. 5, as a deflector 40 with an outside surface 44 shaped as shown in FIG. 5. The outside surface includes a flat top surface portion 46 extending largely horizontally and an upper-outer surface portion 48 curved approximately 90° about an axis 47. The outside surface also includes a lower-outer surface portion 50 concavely curved about an axis 52, to merge with the surface portion 48. The location 49 where the surface portions merge extends at an incline of over 60° from the horizontal to allow a raindrop to fall rapidly thereat. The bottom of the concave surface portion 50 merges with a substantially flat horizontal lower outer surface portion 54 which ends in a relatively sharp corner 56 of at least 90 degrees. The outside surface also includes an outer edge 58 and a horizontal downwardly facing bottom surface portion 60 lying slightly above the top 62 of the door 64.

A raindrop moving down along the side of the vehicle at 18 is likely to move along the surface portions 46, 48 in the same manner as for the prior art door frame. However, as the falling raindrop encounters the concave surface portion 50, the raindrop accelerates down and in an outward direction away from the vehicle. The bottom of the surface portion 50 and the lower surface portion 54 direct a moving drop outwardly away from the vehicle. The sharp corner 56 encourages separation of the raindrop from the frame, because the outwardly moving raindrop would have to suddenly change direction to move down along the outer edge 58. An even sharper edge, which could be obtained by forming the bottom surface portion 60 as indicated at 60A, to form an almost 180° corner at 56, would further aid in encouraging drop-off of rain droplets instead of their flowing around the corner. However, a corner formed by a surface 60A is thin and difficult to injection mold. Application has formed several door frames of the type shown in FIGS. 3–6 and tested the design, and found that very little of the raindrops will pass around the corner 56, shown in solid lines in FIG. 5. While the height H through which the drop falls is about ten millimeters, the radius of curvature of the corner 56 is preferably less than one-tenth as much, such as under one millimeter, to provide a sharp corner. The corner 59 at the bottom of the edge 58 is also preferably sharp.

The door 64 (FIG. 3) has front and rear ends 70, 72, and one end 70 can pivot about a vertical axis 71 so the opposite end 72 can move outward, away from the vehicle side. The upper part or deflector 40 of the door frame is formed with rear and front end deflector portions 74, 76. Each of the end portions extends to a location lying both below and beyond a corresponding door edge and below the top 62 of the door front end. The rear deflector portion 74 lies at a point 78 below and rearward of door edge 72, while the front deflector portion 76 extends to a point 80 below and forward of the front door edge 70. Each door end is rounded at its top such as at 84, at a radius of curvature of at least one centimeter, and each end deflector portion such as 74 is correspondingly rounded and is tapered to have a progressively smaller width W and therefore lie progressively less outward at progressively lower locations. Each end deflector portion such as 74 is useful when the vehicle is traveling rapidly in a rainstorm, which could cause raindrops to directly reach the top of the door. The end deflectors prevent such an occurrence. Actually, only the forward deflector 76 is necessary in this case, but the door assembly is formed so that it can be mounted at either side of the vehicle and still provide a front end deflector.

Even if a raindrop should find its way into the space 90 (FIG. 5) between the top 62 of the door and the bottom surface portion 60 of the frame, such a water droplet is not likely to flow into the inner region 38 where exposed electrical contacts lie. Applicant provides a ridge 92 which lies closely against another ridge 94 on the door, to form a thin horizontal space 98 between them. A water droplet is likely to be trapped by capillary action in the space 98, and other water droplets will flow along this space to the front or side edges 92f, 93r (FIG. 4) of the ridge, where the water will be conducted downwardly and away from the inner region 38.

Applicant employs a round inward projection 100, on its inside surface 101 which faces the vehicle side, around each of the mounting holes 102 through which a screw (such as 103 in FIG. 3) can pass to anchor the door frame to the vehicle side 16. The projections spaces the top of the frame from the vehicle side. A strip of putty sealant 104 is provided along the periphery of the frame. The putty provides a water-resistant seal. In the prior art shown in FIG. 2, the door frame was screwed directly against the side 16 of the vehicle. since the sides 16 of a common recreation vehicles are formed of wood and have uneven surfaces, there is considerable possibility of leakage of water through the region 108 between the rear of the door frame and the vehicle's side. Applicant's use of a projection 100 to space most of the inner surface of the frame away from the vehicle, provides room for the putty 104 that effects a substantially watertight seal between an uneven surface formed by the vehicle frame's sides 16 and the utility door frame.

Thus, the invention provides a utility door for a vehicle, which resists the entrance of rainwater into the utility connection region such as 38 of the door assembly. This is accomplished by forming the upper end of the door frame with a surface which includes a concave outer portion that directs a downwardly flowing drop in an outwardly direction so that the drop tends to leave the vehicle. The end of the concave surface portion (50) and any substantially horizontal surface (54) outward thereof ends in a sharp corner which further encourages a raindrop to leave the door frame. Additional barriers are provided to prevent entrance of rain in other ways.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for deflecting rain from a utility door lying at a side of a vehicle, wherein the utility door has an end that can pivot open about a vertical axis to allow an opposite end of the door to move outwardly from a closed position, and the utility door has a top, comprising:

a deflector lying above the top of said utility door, and defining a top surface portion, an upper-outer surface portion extending from the top surface portion at a downward-outward incline from the horizontal, and a lower-outer surface portion merging with said upper-outer surface portion and extending in a concave curve in a progressively more horizontal direction at progressively more outward locations, said lower-outer surface portion having a bottom lying outward of said door and slightly above it, and said deflector being free of obstructions outward of said bottom of said lower-outer surface portion to allow rain droplets to move outward and downward in free fall therefrom.

2. The apparatus described in claim 1 wherein:
said deflector forms a corner of a radius of curvature of less than one millimeter at an outermost location of said lower outer surface portion.

3. The apparatus described in claim 1 wherein:
said door has front and rear ends, and said deflector has front and rear end portions with said deflector front end portion extending forward and below said top of said utility door, and with said rear deflector end portion extending rearward and below said top of said utility door, each of said door ends being rounded near the top and each of said deflector end portions being correspondingly rounded and lying closely above the door end and tapered to lie progressively less outward at progressively lower locations.

4. The apparatus described in claim 1 wherein:
said deflector being part of a door frame with a plurality of mounting holes for receiving screws to mount the door frame on a side of the vehicle, said door frame having an inward projection around each of said holes for spacing the top of the door frame from the vehicle side, and including a quantity of sealant lying in the space between the top of the door frame and the vehicle side.

5. In a vehicle which includes a body with opposite sides and wheels for supporting said body in primarily forward movement along the ground, and a utility door assembly on a side of the body, said door assembly including a door frame with forward and rearward ends and a door having first and second door ends, said first door end pivotably mounted about a substantially vertical axis on one of said door frame ends so said second door end can move outwardly away from the body side when the door opens, the improvement of means for resisting the entry of rain into said door assembly especially when the vehicle is moving in a rainstorm, wherein:

said door frame has an upper frame part forming a substantially horizontal downward-facing surface immediately above the top of said door and extending outwardly of the door and having an outer end, said upper frame part forming an outer edge extending generally upwardly from said outer end of said horizontal surface, and said upper frame part also forming an outer surface portion extending substantially horizontally and facing upwardly and terminating at said outer edge, a concave surface portion which merges with said outer surface portion and which has a progressively greater incline from the horizontal at locations progressively more inward with the maximum angle being over 60° from the horizontal, a convex surface portion extending from the inner end of the concave surface portion and having a progressively smaller incline at locations progressively more inward, and a substantially horizontal-extending upwardly facing surface portion extending inwardly from said convex surface portion, said frame being free of obstruction outward of said outer edge to allow raindrops moving down along said concave surface portion and outward along said outer surface portion to separate from said door frame and fall onto the ground.

6. The improvement described in claim 5 wherein:
said edge forms at least one corner of at least 90° with a radius of curvature of no more than one millimeter between an outside of said substantially horizontally extending outer surface portion and an outside of said horizontal downwardly facing surface.

* * * * *